United States Patent Office 3,845,139
Patented Oct. 29, 1974

3,845,139
METHOD FOR PREPARING HYDROXY-TERMINATED COPOLYMERS OF BUTADIENE AND ACRYLATE
Mart G. Baldwin, Newtown, Pa., and Samuel F. Reed, Jr., Huntsville, Ala., assignors to the United States of America as represented by the Secretary of the Army
No Drawing. Filed July 31, 1969, Ser. No. 849,255
Int. Cl. C07d 107/02
U.S. Cl. 260—606.5 B                     2 Claims

ABSTRACT OF THE DISCLOSURE

A method for preparing copolymers of carboranyl methyl acrylate and butadiene and pertinent solid propellant formulations using the copolymers are disclosed. The copolymers serve as a binder for solid propellant compositions and also serve to increase the burning rate of solid propellants wherein used.

The copolymers are produced in an organic solvent when polymerization is initiated by an azo type initiator selected from the initiators consisting of azo-bis-(2-methyl-5-hydroxy-valeronitrile), azo - bis - (hydroxyethyl-2-methyl propionate), and azo-bis-(2-methyl-3-hydroxypropionitrile).

BACKGROUND OF THE INVENTION

The burning rates of solid propellants can be increased by introduction of certain additives. Many carborane derivatives have been utilized as additives for this purpose, usually in the form of liquids in which state they also serve as plasticizing agents. In the liquid state the carboranes exhibit the inherent disadvantages characteristic of liquid additives such as loss by evaporation, migration, etc.; and consequently, the propellant systems suffer, particularly on long term storage.

Thus, a need exists for a modified form of carborane which form is not subject to being lost by evaporation or migration from a stored propellant composition.

An object of this invention is to provide a liquid copolymer of a carborane additive and a binder material which is not lost by evaporation or migration from a propellant composition wherein contained.

Another object is to provide a copolymer which is capable of being cured to a rubber-like state.

A further object is to provide a propellant formulation having a binder combined with a carborane additive which is effective in increasing the burning rate of a solid propellant composition wherein used.

SUMMARY OF THE INVENTION

Carboranyl methyl acrylate (CMA) is copolymerized with butadiene in an inert organic solvent after the polymerization reaction is initiated by a suitable initiator such as one selected from the initiators consisting of azo-bis-(2-methyl-5-hydroxyvaleronitrile), azo-bis-(2 - methyl-3-hydroxy-propionitrile), and azo-bis-(hydroxyethyl-2-methyl propionate). The liquid copolymer is characterized by its molecular weight which is preferably in the range of about 3500, its hydroxy-end group content of about 0.60% and its boron content of about 13.5%. The liquid copolymer functions to increase the burning rate of solid propellant compositions as well as functions as a binder for the composition wherein used.

DESCRIPTION OF THE PREFERRED EMBODIMENTS

The copolymer formed by reaction of butadiene with carboranyl methyl acrylate is useful as a binder and also as a burning rate catalyst for solid propellant compositions The liquid copolymer is characterized by its preferred molecular weight of about 3500, its hydroxy-end group content of about 0.60% and its boron content of about 13.5 weight percent. The liquid polymer of butadiene and carboranyl methyl acrylate (CMA) is produced by a procedure as described by the descriptive technique set forth below as Example I. Example II sets forth a test propellant composition utilizing the liquid copolymer.

The Butadiene-CMA weight ratio may be varied from approximately 1:5 to 1:19 in preparative procedures.

The copolymers of this invention are tested in a propellant formulation and compared with a formulation utilizing only butadiene. The copolymer included those containing 5, 10, 15, 20, and about 50 weight percent CMA.

EXAMPLE I

Procedure for polymerization of butadiene and carboranyl methyl acrylate (CMA): To a glass high-pressure reactor (Aerosol tube) is introduced 30 ml. of dioxane, 4.88 g. (0.02 moles) carboranyl methyl acrylate (CMA) and 1.65 g. (0.0066 moles) azo-bis-(2-methyl-5-hydroxy-valeronitrile) (AMHV). The reactor is attached to a vacuum line and deaerated by three alternate freeze-thaw cycles. At this point 10.8 g. (0.2 moles) of butadiene is condensed into the reactor, and the reaction is removed from the vacuum line and placed in an oil bath at 66–67° C. Heating is continued for a period of 72 hours. On cooling, the reactor is vented, the solvent removed by evaporation, and the copolymer reprecipitated by dissolving in ether followed by the addition of methanol. After decanting the solvents, the copolymer is stripped of excess solvents on a rotary evaporator and finally dried at 70–75° C. under reduced pressure (1 mm.) for a period of 24 hours. The liquid copolymer is then characterized by its molecular weight, hydroxy-end group content and elemental analysis. These values are: molecular weight—3500, hydroxy-end group content—0.60, boron—13.5% (calculated 14.05%).

EXAMPLE II

The propellant test composition set forth below illustrates the use of the copolymer of this invention. The burning rates for the test composition are set forth in Table III wherein the rates are compared with a propellant wherein butadiene in like amount percent by weight is the standard.

|  | Wt. percent |
|---|---|
| Butadiene/CMA copolymer binder | 10.0 |
| Isodecyl Pelargonate plasticizer | 10.0 |
| Aluminum Powder | 10.0 |
| Ammonium Perchlorate (56μ) | 70.0 |

Table I provides data for preparation of Butadiene-CMA Copolymers. Polymerization temperatures may conveniently be maintained in the range of 60–80° C. Reaction times may vary between 24–120 hours. The preferred range for reaction is about 72 hours.

Physical property data on the copolymers is given in Table II.

Burning rate data for the propellant test compositions of Example II is set forth under Table III. The data indicates that carborane included as part of the propellant binder is effective in increasing the burning rate.

TABLE I
Experimental Data for Preparation of Butadiene-CMA Copolymers
[Temp.: 66–67° C. Time: 72 hours]

| Number | Butadiene (g.) | CMA (g.) | AMHV (moles) | Molar ratio of monomers | Solvent (30 ml.) | Weight polymer (g.) | Percent yield |
|---|---|---|---|---|---|---|---|
| 1 | 10.8 (0.2 mole) | 4.88 (0.02 mole) | 0.0066 | 10/1 | Dioxane | 8.0 | 51 |
| 2 | 10.8 (0.2 mole) | 4.88 (0.02 mole) | 0.0066 | 10/1 | Toluene | 7.9 | 50 |
| 3 | 10.8 (0.2 mole) | 4.88 (0.02 mole) | 0.0066 | 10/1 | DMF | 6.1 | 39 |
| 4 | 10.8 (0.2 mole) | 9.76 (0.04 mole) | 0.0072 | 5/1 | Dioxane | 8.8 | 43 |
| 5 | 10.8 (0.2 mole) | 14.64 (0.06 mole) | 0.0078 | 3.3/1 | ...do | 11.3 | 44 |
| 6 | 19.0 (0.35 mole) | 1.0 (0.0044 mole) | 0.0107 | 87.5/1 | ...do | 11.8 | 59 |
| 7 | 18.0 (0.33 mole) | 2.0 (0.0088 mole) | 0.0103 | 37.5/1 | ...do | 12.1 | 60 |
| 8 | 17.0 (0.32 mole) | 3.0 (0.0131 mole) | 0.0098 | 24/1 | ...do | 11.9 | 59 |
| 9 | 15.0 (0.28 mole) | 5.0 (0.022 mole) | 0.009 | 15.7/1 | ...do | 9.7 | 48 |

TABLE II
Physical Property Data on Butadiene-CMA Copolymers

| Number | Molecular weight | Weight percent OH Calcd.[1] | Weight percent OH Found | Percent B in polymer Calcd.[2] | Percent B in polymer Found |
|---|---|---|---|---|---|
| 1 | 3,500 | 0.97 | 0.60 | 14.05 | 13.5 |
| 2 | 3,200 | 1.06 | 0.95 | 14.05 | 8.4 |
| 3 | 2,900 | 1.17 | 1.02 | 14.05 | 11.0 |
| 4 | 3,700 | 0.92 | 0.84 | 21.65 | 15.8 |
| 5 | 3,000 | 1.13 | 0.62 | 24.7 | 20.4 |
| 6 | 3,200 | 1.06 | 1.36 | 2.32 | 2.00 |
| 7 | 3,300 | 1.03 | 1.31 | 4.69 | 4.20 |
| 8 | 3,600 | 0.94 | 1.0 | 4.02 | 7.8 |
| 9 | 2,600 | 1.31 | 1.04 | 10.07 | 8.1 |

[1] Calculated OH content is based on observed molecular weight, with the assumption that each molecule contains two hydroxyl groups.
[2] Based on monomer charge.

TABLE III
Burning Rate Data on Butadiene-CMA Copolymers in Propellant Formulations

| Copolymer number | Boron content (percent of propellant) | Burning rate (in./sec.) 800–824 p.s.i. | Burning rate (in./sec.) 1,600–1,615 p.s.i. |
|---|---|---|---|
| Standard | 0 | 0.501 | 0.797 |
| 6 | .20 | 0.529 | 0.816 |
| 7 | .42 | 0.542 | 0.858 |
| 8 | .78 | 0.558 | 0.910 |
| 9 | .81 | 0.660 | 1.033 |

The copolymers of this invention include those copolymers containing from about 5 to about 50 weight percent carboranyl methyl acrylate with the remaining weight percent of copolymer being reacted butadiene. The amount of the copolymer when used in propellant formulations can vary from about 5 to about 30 weight percent. The burning rates of the propellant increase with increased boron content; therefore, a copolymer with a higher weight percent of carboranyl methyl acrylate in the copolymer composition and the use of a correspondingly higher weight percent of copolymer in the propellant formulation provides a means of providing even higher burning rates than those illustrated in Table III. The test formulation set forth in Table III was selected for its ease of preparation and reproducibility rather than for its high burning rate. Hence the use of about 10 weight percent binder does provide lower burning rate control as desired. However, the use of a higher weight percent binder having a higher carboranyl methyl acrylate content is preferred if a high burning rate propellant is desired.

We claim:

1. A method of polymerizing butadiene and carboranyl methyl acrylate to yield hydroxyl terminated copolymers having a molecular weight range from about 2600 to about 3700, an hydroxy-end group content in the range from about 0.60 weight percent to about 1.36 weight percent, and a boron content in the range of about 2 to about 20.4 weight percent, said method comprising reacting carboranyl methyl acrylate and a suitable polymerization initiator in an inert organic solvent with butadiene at a reaction temperature and for a reaction time period sufficient for said reaction to take place after which solvent removal is effected and said copolymers are dried at a suitable drying temperature while under reduced pressure, said butadiene to carboranyl methyl acrylate being in weight ratio of about 1:5 to about 19:1, said initiator being selected from azo-bis-(2-methyl-5-hydroxy-valeronitrile), azo-bis-(2-methyl - 3 - hydroxypropionitrile), and azo-bis-(hydroxyethyl-2-methyl propionate), said inert organic solvent being selected from dioxane, toluene, and dimethyl formamide, said reaction temperature being in the range of about 60° C. to about 80° C., said reaction time being from about 24 hours to about 120 hours, said drying is accomplished at a suitable temperature in the range of about 70° C. to about 75° C., and said reduced pressure is in the range of about 1 millimeter.

2. The method of claim 1 wherein said butadiene to carboranyl methyl acrylate weight ratio is about 2.2 to 1, said initiator is azo-bis-(2-methyl-5-hydroxy-valero-nitrile), and said inert organic solvent is dioxane to yield said copolymers that have a molecular weight of about 3500, hydroxy-end group content of about 0.60 weight percent and a boron content of about 13 to about 15 weight percent.

References Cited
UNITED STATES PATENTS

| | | | |
|---|---|---|---|
| 3,183,216 | 5/1965 | Cohen et al. | 260—83.5 |
| 2,778,818 | 1/1957 | Hyson et al. | 260—192 |
| 2,877,212 | 3/1959 | Seligman | 260—77.5 |
| 3,268,506 | 8/1966 | Vries | 260—192 |
| 3,306,888 | 2/1967 | Mortimer | 260—192 X |
| 3,427,297 | 2/1969 | Chaille et al. | 260—89.7 |
| 3,518,241 | 6/1970 | Duling et al. | 260—89.5 |
| 3,427,295 | 2/1969 | Reed | 260—86.1 |
| 3,562,236 | 2/1971 | D'Alelio | 260—86.1 X |

OTHER REFERENCES

Banford et al., "Transactions of the Faraday Society," 56, pp. 932–936 (1960).

BENJAMIN R. PADGETT, Primary Examiner

E. A. MILLER, Assistant Examiner

U.S. Cl. X.R.

149—22